United States Patent
Wu et al.

(10) Patent No.: US 12,471,194 B2
(45) Date of Patent: Nov. 11, 2025

(54) DRIVING CONTROL CIRCUIT OF POWER TRANSISTOR, LIGHTING CONTROL CIRCUIT AND LIGHTING CIRCUIT

(71) Applicant: Joulwatt Technology Co., Ltd., Hangzhou (CN)

(72) Inventors: Minghao Wu, Hangzhou (CN); Guoqiang Liu, Hangzhou (CN)

(73) Assignee: Joulwatt Technology Co., Ltd., Hangzhou (CN)

(*) Notice: Subject to any disclaimer, the term of this patent is extended or adjusted under 35 U.S.C. 154(b) by 164 days.

(21) Appl. No.: 18/594,388

(22) Filed: Mar. 4, 2024

(65) Prior Publication Data
US 2024/0314906 A1   Sep. 19, 2024

(30) Foreign Application Priority Data
Mar. 13, 2023 (CN) .......................... 202310264976.9

(51) Int. Cl.
*H05B 45/345*   (2020.01)
*H05B 45/37*    (2020.01)

(52) U.S. Cl.
CPC ........... *H05B 45/345* (2020.01); *H05B 45/37* (2020.01)

(58) Field of Classification Search
CPC ...... H05B 45/345; H05B 45/37; H05B 45/10; H05B 45/3725; H05B 45/375; H05B 45/30; H05B 45/34; H05B 45/50; H05B 47/175
See application file for complete search history.

(56) References Cited

U.S. PATENT DOCUMENTS

| | | | | |
|---|---|---|---|---|
| 10,880,968 | B1* | 12/2020 | Zhou | H05B 45/20 |
| 11,612,025 | B2* | 3/2023 | Liao | H05B 45/355 |
| 11,882,632 | B2* | 1/2024 | Archer | H05B 47/16 |

FOREIGN PATENT DOCUMENTS

| | | |
|---|---|---|
| CN | 106658866 A | 5/2017 |
| CN | 208754577 U | 4/2019 |
| CN | 215379284 U | 12/2021 |

\* cited by examiner

*Primary Examiner* — Minh Tran
(74) *Attorney, Agent, or Firm* — IPro, PLLC

(57) ABSTRACT

The present application discloses a driving control circuit of a power transistor, a lighting control circuit and a lighting circuit. The control circuit includes a protocol conversion circuit and a driving regulation circuit. The protocol conversion circuit stores received input data signal as multi-channel digital signals and converts the multi-channel digital signals into a plurality of regulation parameters. The driving regulation circuit adjusts the driving current and driving voltage of the power transistor according to a plurality of regulation parameters so as to match various types of power transistors. The control circuit according to the present disclosure converts the input data signal into a plurality of regulation parameters, adjusts the driving current and driving voltage of the power transistor to match various types of power transistors, and improves driving capability, compatibility, and adaptability of the circuit.

11 Claims, 4 Drawing Sheets unipolar Return-to-Zero coding non-unipolar Return-to-Zero coding bipolar Return-to-Zero coding non-bipolar Return-to-Zero codin

DRIVING CONTROL CIRCUIT OF POWER TRANSISTOR, LIGHTING CONTROL CIRCUIT AND LIGHTING CIRCUIT

CROSS-REFERENCE TO RELATED APPLICATIONS

The present disclosure claims priority to a Chinese patent application No. 202310264976.9, filed on Mar. 13, 2023, and entitled "DRIVING CONTROL CIRCUIT OF POWER TRANSISTOR, LIGHTING CONTROL CIRCUIT AND LIGHTING CIRCUIT", the entire contents of which are incorporated herein by reference, including the specification, claims, drawings and abstract.

TECHNICAL FIELD

The present disclosure relates to the field of power electronics technology, and more particularly, to a driving control circuit of a power transistor, a lighting control circuit, and a lighting circuit.

BACKGROUND

Today, many LED lighting products based on LED dimming technology have appeared on the market, mainly for landscape decorative lighting and architectural decorative lighting. LED lighting products can be seen as a load, and a switching power supply can be used to supply power to the load.

In a case that the switching power supply is used for supplying power to the load, an inductor current and an output voltage are typically sampled, and the output current or output voltage may be adjusted according to a feedback signal derived from the corresponding sampling signals. With an integration trend of electronic devices, many switching power supplies are used in the form of integrated circuits. A chip in which a switching power supply is integrated typically has pins to be configured for certain functions. Today, most of commercially available products use a PWM signal to control the switching power supply for dimming. Not only a dimming mode is limited, but also driving capability is poor due to a constant driving voltage and constant pull-up and pull-down abilities. These products can not be compatible with various types of transistors simultaneously, thus exhibiting poor flexibility. Therefore, it is necessary to provide improved technical solutions to overcome the above technical problems in the existing technology.

SUMMARY

In view of this, it is an object of the present disclosure to provide a driving control circuit of a power transistor, a lighting control circuit, and a lighting circuit to solve problems in the prior art.

According to a first aspect of the present disclosure, there is provided a driving control circuit of a power transistor, comprising:
  a protocol conversion circuit that stores received input data signal as multi-channel digital signals and converts the multi-channel digital signals into a plurality of regulation parameters;
  a driving regulation circuit that is coupled to the protocol conversion circuit and a control terminal of the power transistor, and that adjusts a driving current according to a driving current regulation parameter in a plurality of regulation parameters, and/or adjusts a driving voltage of the power transistor according to a driving voltage regulation parameter in the plurality of regulation parameters, so as to match various types of power transistors.

Optionally, the various types of power transistors include Si transistors, SiC transistors, and GaN transistors.

Optionally, the driving regulation circuit adjusts the driving current of the power transistor to control on and off rates of the power transistor.

Optionally, the driving regulation circuit includes:
  a voltage regulator that is coupled to the protocol conversion circuit, a power supply terminal and a control terminal of the power transistor, and that converts an input voltage at the power supply terminal into a supply voltage to be supplied to a post stage, and supplying a driving voltage to the power transistor via an output terminal;
  a pull-up current source that is coupled between an output of the voltage regulator and the control terminal of the power transistor. and
  a pull-down current source that is coupled between the control terminal of the power transistor and a ground terminal, the pull-up current source and the pull-down current source together providing a driving current to the power transistor.

Optionally, the voltage regulator adjusts the driving voltage according to the driving voltage regulation parameter; the pull-up current source and the pull-down current source adjust the driving current according to the driving current regulation parameter.

Optionally, a driving current and a driving voltage of the GaN transistor have values both smaller than those of the Si transistor.

Optionally, the plurality of regulation parameters are analog signals, and the plurality of regulation parameters further include a standby regulation parameter for configuring a sleep mode for the driving control circuit of the power transistor.

Optionally, the protocol conversion circuit converts the input data signal into the driving voltage regulation parameter and the driving current regulation parameter using a single-wire communication protocol or a serial communication protocol.

Optionally, the driving voltage regulation parameter corresponds to a digital signal of 1 bit, the driving current regulation parameter corresponds to a digital signal of 2 bits, and the standby regulation parameter corresponds to a digital signal of 1 bit.

According to a second aspect of the present disclosure, there is provided a lighting control circuit comprising:
  a power transistor;
  the driving control circuit of the power transistor as described above; and
  a dimming selection circuit that selects a dimming mode according to a digital signal, and that generates a PWM dimming signal in a chopper dimming mode, and generates an analog dimming signal in an analog dimming mode, so as to control on and off states of the power transistor.

Optionally, the lighting control circuit further comprises:
  a protection circuit that obtains a physical parameter threshold according to a regulation parameter generated by the digital signal, and protects the circuit when a sampled physical parameter reaches the physical parameter threshold.

According to a third aspect of the present disclosure, there is provided a lighting circuit comprising:

multi-channel LED strings; and
the lighting control circuit as described above for controlling a dimming mode of the multi-channel LED strings.

In the driving control circuit of the power transistor, the lighting control circuit and the lighting circuit according to the embodiments of the present disclosure, the input data signal is provided to the protocol conversion circuit with the configured protocol, and is stored as multi-channel digital signals, and then is converted into a plurality of regulation parameters. The driving voltage and driving current of the power transistor are adjusted according to the driving voltage regulation parameter and driving current regulation parameter in the plurality of regulation parameters. This allows the lighting control circuit to be compatible with various types of power transistors. Therefore, the driving voltage and driving current can be adjusted corresponding to the type of power transistor, only according to the protocol, without the need for replacing the control circuit. The lighting control circuit has improved overall driving capability, flexibility and compatibility. Moreover, the input data signal is received through a single wire using either a single-wire communication protocol or a serial communication protocol to adjust various circuits and to achieve a plurality of control functions. Thus, the switching circuit control scheme can be achieved in various modes, by simple operations, with a fast speed, and in an efficient manner, and can replace the PWM modulation perfectly.

DETAILED DESCRIPTION

Preferred embodiments of the present disclosure are described in detail below in conjunction with accompanying drawings, but the present disclosure is not limited to these embodiments. The present disclosure encompasses any substitutions, modifications, equivalents, and solutions made in the spirit and scope of the present disclosure.

In order to give the public a thorough understanding of the present disclosure, specific details are described in the following preferred embodiments of the present disclosure. However, the present disclosure can be fully understood without a description of these details for those skilled in the art.

The present disclosure is described in more detail by way of example in the following paragraphs with reference to the accompanying drawings. It should be noted that the accompanying drawings are in a relatively simplified form and not drawn to accurate scale, and are only used to conveniently and clearly illustrate the purpose of the embodiments of the present disclosure.

Figure 1:
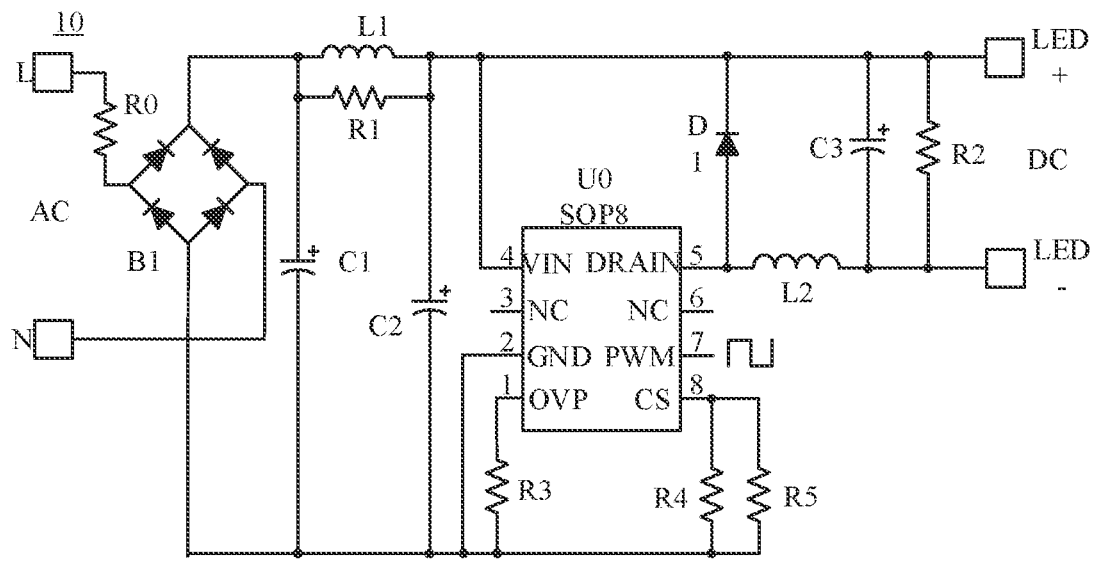
FIG. 1 shows a schematic circuit diagram of a conventional switching power supply.

FIG. 1 shows a schematic circuit diagram of a conventional switching power supply.

As shown in FIG. 1, the switching power supply is based on a buck topology. In addition to the switching circuit, a rectifier bridge B1 is provided as a previous stage, and the LED lamp is a load as a post stage. An AC voltage generated by the AC power supply is rectified by the rectifier bridge B1 to generate a DC input voltage. The input voltage is filtered by filter capacitors C1 and C2, the filtered input voltage Vin is provided to a lighting control chip U0 of the switching circuit, and an output voltage Vo which is a DC voltage converted by the switching circuit is provided to the load. For example, the AC voltage is 90-260V and the DC voltage is 80V. A control chip of power supply controls on and off states of its internal power transistor by a control circuit to regulate an output voltage. In FIG. 1, both the control circuit and the power transistor are located inside the control chip U0.

The control chip U0 includes a plurality of pins, for example, 8 pins. Pin 1 is labeled as OVP and grounded through a resistor R3, which is used to set an OVP level through the resistor for over-voltage protection; Pin 2 is labeled as GND and is grounded; Pin 3 is labeled as NC and is float; Pin 4 is labeled as VIN and is coupled to an input voltage Vin; Pin 5 is labeled as DRAIN and is a drain terminal of the transistor which is connected to a diode D1 and an inductor L2. The transistor, the diode D1 and the inductor L2 constitute a buck topology, with a capacitor C3 as an output filter capacitor. Pin 6 is labeled as NC and is float; Pin 7 is labeled as PWM and receives an input signal, that is, a PWM control signal, to control the operation of circuits inside the chip; Pin 8 is labeled as CS and is a sampling pin, which is grounded through resistors R4 and R5, for sampling a source voltage of the transistor. Internal circuits are regulated accordingly. Pin 3 can also be labeled as COMP, which is grounded through an external compensation resistor; Pin 6 can also be labeled as FB and receives a feedback signal to adjust an output voltage. When Pin 3 and Pin 6 are configured in such manner, all of the 8 pins of the control chip U0 are used, and there are more external resistors.

The switching power supply controls an operation state of the switching circuit by the control chip of power supply, performing dimming with a PWM signal which is received through a single wire. It can only support a single dimming mode, and has fixed line voltage compensation, and is not compatible with both low-frequency applications and high-frequency applications; moreover, external pins and resistors are needed for setting an OVP level or an OTP point and an OTP slope. There are more peripheral devices being used. Moreover, a driving voltage and a driving current at a control terminal of the power transistor is fixed, with poor driving capability. It can not be compatible with both Si transistors and GaN transistors. Various switching circuits are not easily compatible with each other at the same time. An on time has a fixed value, which means that the current curve performs poorly.

The present disclosure improves internal circuits of the control chip of power supply in the above switching power supply, so that it can flexibly adjust a driving current and/or a driving voltage to match various types of power transistors and improve driving capability; and thus, it can flexibly achieve various and multi-level over-threshold protections even without external compensation resistors, and can be applied to various switching circuits and various dimming modes. The following is detailed in conjunction with the accompanying drawings.

Figure 2:
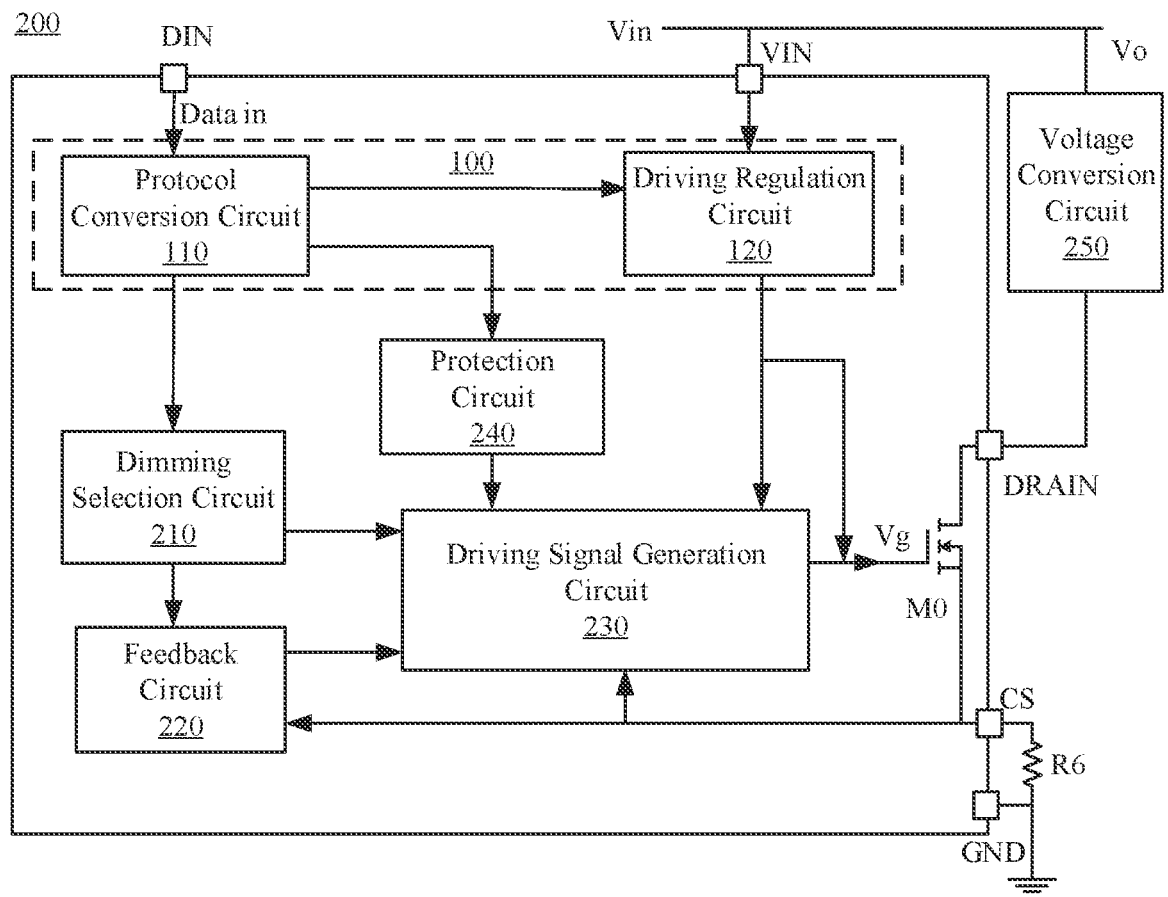
FIG. 2 shows a schematic circuit block diagram of a lighting control circuit according to an embodiment of the present disclosure.

FIG. 2 shows a schematic circuit block diagram of a lighting control circuit according to an embodiment of the present disclosure.

As shown in FIG. 2, a driving control circuit 100 according to an embodiment of the present invention includes a protocol conversion circuit 110 and a power regulation circuit 120. The driving control circuit 100 is used to adjust a driving current and a driving voltage of the power transistor M0 which can be used in various circuits. Thus, the driving control circuit 100 according to this embodiment can be applied to various control circuits of power transistor, such as a lighting control circuit as shown in FIG. 2. The lighting control circuit 200 includes: a power transistor M0, a driving signal generation circuit 230, and a driving control circuit 100. Briefly, the driving signal generation circuit 230 is coupled to a control terminal of the power transistor M0 for generating a driving signals Vg according to a plurality of input signals to control on and off states of the power transistor M0; the protocol conversion circuit 110 receives and stores an input data signal Data in as multi-channel digital signals (B0, B1, B2-B3 . . . B11-B18), and converts the multi-channel digital signals into a plurality of regulation parameters, which may include an over-voltage protection regulation parameter, an over-temperature protection regulation parameter, a driving voltage regulation parameter, and a driving current regulation parameter; The driving regulation circuit 120 is used to adjust a driving current and a driving voltage of the power transistor according to the driving current regulation parameter and the driving voltage regulation parameter so as to match various types of power transistors, or to provide different driving currents or driving voltages for the power transistor to improve driving capability.

When the driving control circuit 100 is applied to the lighting control circuit 200, the lighting control circuit 200 also includes a dimming selection circuit 210, a feedback compensation circuit 220, and a protection circuit 240. The protocol conversion circuit 110 converts an input data signal into the multi-channel digital signals, and adjusts various circuit parameters respectively. For example, in this embodiment, it is divided into eight digital signals, namely B8, B9-B10, B11-B18, B6-B7, B4-B5, B0, B1 and B2-B3, which are referred to as a first-channel digital signal, a second-channel digital signal, and the like. Here, the words "first" and "second" are only used for distinction, and are not limited as an output order of various data signals. The dimming selection circuit 210 is coupled to the protocol conversion circuit 110, and selects the second-channel digital signal (B9-B10) and the third-channel digital signal (B11-B18) to be output as a first dimming signal according to a value of the first-channel digital signal (B8), or selects the third-channel digital signal to be output as a second dimming signal; The feedback compensation circuit 220 is coupled to the dimming selection circuit 210 to generate a reference signal Vref according to the second dimming signal and an output feedback signal Vcs; the driving signal generation circuit 230 is coupled to the dimming selection circuit 210, the feedback compensation circuit 220, and a control terminal of the power transistor M0. It generates the driving signal Vg to control an off moment of the power transistor M0 according to the first dimming signal for achieving a first dimming mode, and generates the driving signal Vg to control an off moment of the power transistor M0 according to the reference signal Vref and the output feedback signal Vcs for achieving a second dimming mode.

Further, the protocol conversion circuit 110 converts a fourth-channel digital signal (B6-B7) into an over-voltage protection regulation parameter, converts a fifth-channel digital signal (B4-B5) into an over-temperature protection regulation parameter, converts a sixth-channel digital signal (B0) into a standby regulation parameter, converts a seventh-channel digital signal (B1) into a driving voltage regulation parameter, and converts a eighth-channel digital signal (B2-B3) into a driving current regulation parameter. The protection circuit 240 is coupled to the protocol conversion circuit 110 and the driving signal generation circuit 230, converts the over-temperature protection regulation parameter and the over-voltage protection regulation parameter from the protocol conversion circuit 110 into at least one physical parameter threshold corresponding to sampled physical parameter, and protects the lighting control circuit 200 when the sampled physical parameter reaches the corresponding physical parameter threshold. The driving regulation circuit 120 is coupled to the protocol conversion circuit 110 and a control terminal of the power transistor M0, receives an input voltage Vin, converts it into a supply voltage for the driving signal generation circuit 230 and other circuits. Moreover, the driving regulation circuit 120 adjusts a driving current and a driving current of the power transistor according to the driving voltage regulation parameter and the driving current regulation parameter, so that the lighting control circuit can match various types of power transistors.

In FIG. 2, the lighting control circuit 100 can be packaged within a chip and communicates with external components through a plurality of pins. For example, the protocol conversion circuit 110 receives the input data signal Data in through the Pin DIN; the Pin GND is grounded; the driving signal generation circuit 230 is coupled to the control terminal of the main power transistor M0. A source of the main power transistor M0 is coupled to an external resistor R6 through the Pin CS, and then is grounded. A drain of the main power transistor M0 is coupled to an external voltage conversion circuit 250 through the Pin DRAIN. The voltage conversion circuit 250 may be a switching circuit that converts the input voltage Vin into the output voltage Vo and provides it to the post-stage load. The feedback compensation circuit 220 samples the current flowing through the main power transistor M0 through the Pin CS to generate the output feedback signal Vcs. The driving regulation circuit 120 samples the input voltage Vin through the VIN pin.

The lighting control circuit 200 according to this embodiment receives the input data signal, stores it as multi-channel digital signals according to the protocol having been configured, and converts the multi-channel digital signals into a plurality of regulation parameters, such as a driving voltage regulation parameter and a driving current regulation parameter. This allows for the regulation of the driving voltage and the driving current of the power transistor to match various types of power transistors, and improves driving capability, compatibility, and adaptability of the circuit. In a case that the load is a lighting device such as an LED lamp, different dimming modes are selected and output different dimming signals according to the multi-channel digital signals to adjust the driving signal to control dimming brightness and dimming depth, etc. It can also generate a plurality of regulation parameters according to the multi-channel digital signals, and obtain the physical parameter thresholds corresponding to various physical parameters according to the plurality of protection regulation parameters. For example, it can obtain multi-level protection thresholds according to the protocol, so that it is unnecessary to provide various types of compensation resistors on the periphery of the circuit, which reduce the number of the peripheral components of the circuit, thereby reducing the cost. Therefore, different parameters of various circuits can be adjusted according to different digital signals, so that the functions of various circuit can be improved. The lighting control circuit can be applied to different circuit structures to supply power to different loads and improve applicability.

Figure 3:
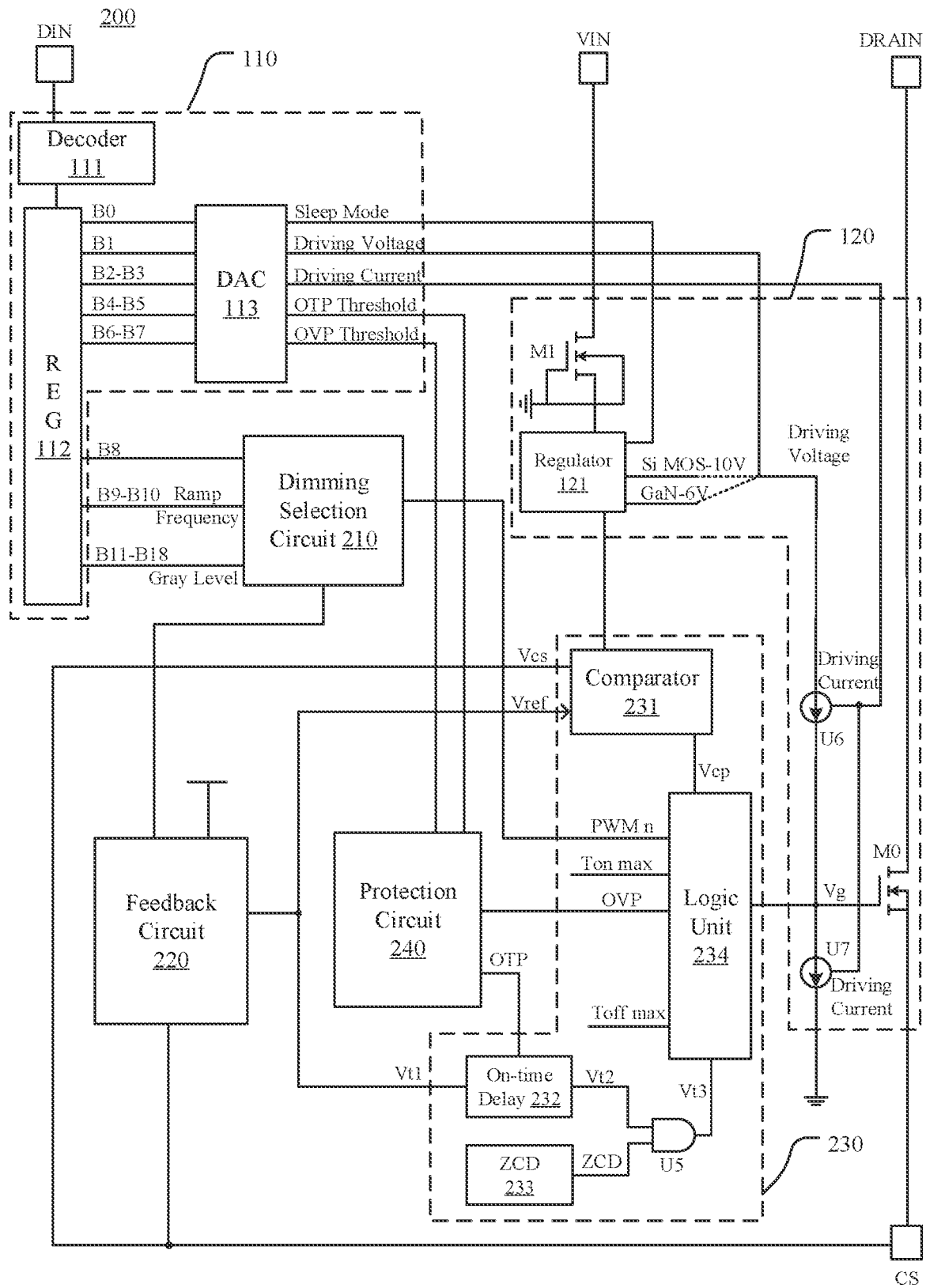
FIG. 3 shows a schematic circuit diagram of various circuits in the lighting control circuit shown in FIG. 2.

FIG. 3 shows a schematic circuit diagram of various circuits in the lighting control circuit shown in FIG. 2.

As shown in FIG. 3, the protocol conversion circuit 110 includes a decoder 111, a register bank 112, and a DAC unit 113, and the decoder 111 receives the input data signal Data in and decodes it so that it is transmitted in a plurality of bits; The register bank 112 includes a plurality of registers that sequentially store a plurality of bits and output the plurality of bits as multi-channel digital signals according to a preconfigured single-wire transmission protocol or a serial communication protocol. When the serial communication protocol is used to configure the input data signal, the lighting control circuit 100, the driving control circuit 200 and even a chip that encapsulates the lighting control circuit may be regarded as a slave, and an MCU may be regarded as a host. The host sends data to the slave to realize simplex data transmission. The number of registers is equal to the bits of the transmitted data. Take the transmitted data of 19 bits as an example, the register bank 112 includes 19 registers, each register stores one bit and the data output by different numbers of registers is combined into one-channel digital signal.

In the protocol conversion circuit 110, taking the input data signal configured with a single-wire communication protocol as an example, the register bank 112 outputs 8-channel digital signals, for example, where the first-channel digital signal is B8, which contains one bit, occupies 1 bit of space, and is output by one register; the second-channel digital signal is B9-B10, which contains two bits, occupies 2 bits of space, and is output by two registers; similarly, the third-channel digital signal is B11-B18, which contains 8 bits and occupies 8 bits of space, the fourth-channel digital signal is B6-B7, which contains 2 bits, the fifth-channel digital signal is B4-B5, which contains 2 bits, the sixth-channel digital signal is B0, the seventh-channel digital signal is B1, and the eighth-channel digital signal is B2-B3. The input data signal is decoded into 19 bits, corresponding to the 8-channel digital signals. The number of bits here can be configured according to the content of the protocol and the function to be realized. When only dimming configuration is required, only the first three digital signals can be kept. In such case, only 10 bits of input data signal can be provided. When only the circuit protection function is required, only the fourth and fifth-channel digital signals can be kept. In such case, only 4 bits of input data signal can be provided. When only the driving capability needs to be adjusted, only the protocol information corresponding to the bits B0-B3 can be kept. The DAC unit 113 is coupled to an output of the register bank 112 for converting the multi-channel digital signals into a plurality of regulation parameters. The plurality of regulation parameters are analog signals which is converted from the digital signals. For example, the fifth to eighth digital signals need to be converted into regulation parameters of 5 different analog signals so as to adjust different parameters of various circuits to achieve various functions.

The dimming selection circuit 210 may include, for example, a dimming mode selection unit, a PWM generator, and a DAC unit. The dimming mode selection unit outputs a first selection signal S1 or a second selection signal S2 according to the value of the received first-channel digital signal to configure the dimming mode. The PWM generator outputs a first dimming signal as a PWM dimming signal according to the second-channel digital signal and the third-channel digital signal, under the control of the first selection signal. The DAC unit converts the third-channel digital signal into a second dimming signal as a grayscale signal, under the control of the second selection signal S2.

The feedback compensation circuit 220 adjusts a value of the reference signal Vref according to the second dimming signal to adjust an off time of the power transistor M0, thereby adjusting a peak value of the current flowing through the power transistor M0. The driving signal generation circuit 230 adjusts a duty cycle of the drive signals Vg according to a first dimming signal PWMn to adjust a value of the current flowing through the power transistor M0. In this embodiment, the feedback compensation circuit 220 outputs the reference signal Vref and a first timing signal Vt1 to the driving signal generation circuit 230.

The protection circuit 240 is coupled to the protocol conversion circuit 110 and the drive signal generation circuit 230, including an over-voltage protection unit and an over-temperature protection unit. The protocol conversion circuit converts the fourth-channel digital signal into an over-voltage protection regulation parameter, and the fifth-channel digital signal into an over-temperature protection regulation parameter. The over-voltage protection unit converts an over-voltage protection regulation parameter OVP Threshold to at least one over-voltage protection threshold, with 2 bits corresponding to four values, 00, 01, 10 and 11, i.e. 4 thresholds. When an output voltage exceeds the over-voltage protection threshold, the over-voltage protection unit outputs an over-voltage protection signal OVP to the drive signal generation circuit 230 to control an off moment of the power transistor M0. The over-temperature protection unit converts an over-temperature protection regulation parameter OTP Threshold to at least one over-temperature protection threshold. When the circuit temperature exceeds the over-temperature protection threshold, the over-temperature protection unit outputs an over-temperature protection signal OTP to an on-time delay unit 232 of the driving signal generation circuit 230, and controls an on moment of the power transistor M0. In some embodiments, the protection circuit 240 may also include an under-voltage protection unit, an over-current protection unit, etc. Therefore, by converting the multi-channel digital signals into different regulation parameters as protection thresholds of various physical parameters, there is no need to provide compensation resistors outside the circuit. The thresholds can be flexibly configured and can be applied to different applications.

The driving signal generation circuit 230 includes a comparator 231, an on-time delay unit 232, a zero-crossing detection unit 233, an AND gate U5 and a logic driving unit 234. The comparator 231 compares the reference signal Vref and the output feedback signal Vcs, and outputs a comparison signal Vcp. The on-time delay unit 232 obtains a second timing signal Vt2 according to the first timing signal Vt1. The zero-crossing detection unit 233 receives a voltage signal Vi representing an inductor current, and outputs a zero-crossing detection signal ZCD when the voltage signal Vi indicates that the inductor current crosses zero. The AND gate U5 waits for a signal of the on-time delay unit 232 after receiving the zero-crossing detection signal ZCD, and outputs a third timing signal Vt3 after receiving the second timing signal Vt2. The logic driving unit 234 generates a first control signal Vctr1 according to the comparison signal Vcp, the PWM dimming signal PWMn, the over-voltage protection signal OVP and a maximum on-time signal Ton max, a second control signal Vctr2 according to the third timing signal Vt3 and a maximum off-time signal Toff max. Both the maximum off-time signal Toff max and the maximum on-time signal Ton max can be generated by a timer. The maximum off-time signal Toff max is effective to turn on the power transistor when the power transistor has been turned off for a maximum time, and the maximum on-time signal Ton max is effective to turn off the power transistor when the power transistor has been turned on for a maximum time. A driving signal Vg are then generated according to the first control signal Vctr1 and the second control signal Vctr2 to control on and off states of the power transistor M0. In one embodiment, the control unit of power supply is a control unit of a power transistor of a flyback converter or an active clamping converter, operating in a peak current control mode. The on-time delay unit 232 is used to set an oscillation time in DCM mode, and the comparator 231 is used to control a peak value of the inductor current. Then, the logic driving unit 234 mainly controls the off moment of the power transistor M0 with the driving signal Vg generated according to the first control signal Vctr1 and the on moment of the power transistor M0 with the driving signal Vg generated according to the second control signal Vctr2.

Thus, in this embodiment, the dimming selection circuit 210 can control an output current of the power transistor with line compensation, and extends to high-frequency and low-frequency applications of the circuit. Moreover, a dimming mode can be flexibly switched to be compatible with analog dimming and chopper dimming. The reliability of the circuit can be improved.

Continuing with reference to FIG. 3, the driving regulation circuit 120 includes a transistor M1 and a voltage regulator 121. The transistor M1 has one terminal being coupled to a power supply terminal Vin, another terminal being coupled to the voltage regulator 121, and a control terminal being grounded. The voltage regulator 121 is used to regulate an input voltage to provide a supply voltage to various circuits. For example, the voltage regulator 121 has an output for providing a driving voltage to the power transistor, and can also adjust the voltage at the output so as to adjust a value of the driving voltage of the power transistor according to a driving voltage regulation parameter Drive Voltage which is converted from a digital signal by the protocol conversion circuit 110.

Further, the driving regulation circuit further includes a pull-up current source U6 and a pull-down current source U7, which provide a driving current for the power transistor M0. The pull-up current source U6 is coupled between the output of the voltage regulator and the control terminal of the power transistor M0, and the pull-down current source U7 is coupled between the control terminal of the power transistor M0 and a ground terminal, both of which constitute a push-pull circuit structure or can be regarded as a totem pole circuit structure. The pull-up current source U6 and the pull-down current source U7 adjust a current at the output according to a driving current regulation parameter Drive Current to adjust a driving current of the power transistor. By adjusting a driving current of the power transistor, on and off rates of the power transistor M0 can be controlled to achieve an effect of turning on by steps.

Specifically, the sixth-channel digital signal is B0, which can be converted into a standby regulation parameter by the DAC unit 113. For example, when its value is 0, it indicates that it is necessary to enter a sleep mode, sends a Sleep Mode signal, controls the voltage regulator 121 or other circuit units to be turned off or enter a sleep mode, and reduce power consumption. The seventh-channel digital signal is B1, which is converted into a driving voltage regulation parameter Drive Voltage. A driving voltage can be adjusted according to a value of B1 to match various types of power transistors. Each type of power transistor with a preset specification corresponds to a set of driving current values and a set of driving voltage values. Various types of power transistors include, for example, Si transistors, SiC transistors, GaN transistors, and the like. A driving current value and A driving voltage value of the GaN transistors have values both smaller than those of the Si transistors. For example, when B1 is 0, the voltage regulator 121 selects to activate a voltage branch of GaN to match the power transistor of the GaN structure, with a driving voltage of the GaN transistor of up to 6.5V. When it's value is 1, the voltage regulator 121 selects to activate a voltage branch of Si MOS to match the power transistor of the Si structure, with a driving voltage of the Si transistor is up to 10V. The eighth-channel digital signal is B2-B3, which is a driving current adjustment parameter, which is converted into a analog signal by the DAC unit 113 to control a value of the driving current. Similarly, since driving current signals and driving voltage signals are in a one-to-one corresponding relationship, when B1 is 0 or 1, B2-B3 outputs a corresponding value and is converted into an analog signal to adjust a driving current by adjusting outputs of the pull-up current source and the pull-down current source. Using the input data signal configured through a single-wire communication protocol or a serial communication protocol, it is possible to match the corresponding driving current and driving voltage for different types of transistors through a single input pin, and to realize the adjustment of the driving current or driving voltage for different types of transistors. It is even possible to adjust a driving current and a driving voltage of the transistor in various circuits which include the transistors of the same type but with different parameters. Certainly, the driving current or the driving voltage can also be adjusted separately, for example, in the circuit structure of the Si transistor, only the driving current is adjusted to control an on rate of the transistor, and the EMI can be adjusted to improve driving capability. Therefore, the driving control circuit according to this embodiment can changed to be adaptable for transistors in different circuits, only by configuring a single-wire communication protocol or a serial communication protocol, without the needs for replacing transistors or other circuit structures, thereby improving applicability and adaptability of the circuit, saving circuit test time and reducing costs.

The following gives data comparison of various parasitic parameters when some of the power transistors are GaN transistors and Si transistors. Various parasitic parameters can be selected from the following parameters: Rdson (parasitic resistance), Qg (gate charge), Ciss (input capacitance), Coss (output capacitance), Crss (output transfer capacitance), Co (tr) (effective output capacitance) and Trr (reverse recovery time). For example, internal resistances of both the GaN transistor and the Si transistor are between 100-200 mΩ, the Qg of the GaN transistor is below 10 nC, and the Qg of the Si transistor can reach tens or even hundreds of nC. The Ciss of the GaN transistor is between 50-100 pF, while the Ciss of the Si transistor is between 1000-2000 pF. The Crss of the GaN transistor are between 0-1 pF, while the Crss of the Si transistor are between 0-20 pF. By comparison, it is found that under the same Rdson, the Ciss of GaN transistor is about 1/15 of that of Si transistor, while the Qg of GaN transistor is about 1/11 of that of Si transistor.

According to the equation: Qg=Ciss*Vgs=(Cgs+Cgd) Vgs=Ig/Fsw, it can be seen that the smaller the Ciss or the gate driving voltage, the smaller the Qg is, and driving currents of the totem pole caused by different Ciss are different, thus, a pull-up current SOURCE is different from a pull-down current SINK. Referring to the above parameter comparison, a driving current Ig=Qg*Fsw. When various types of power transistors are designed with the same switching frequency, the Ig of the GaN transistor is about 1/11 of the Si transistor. Taking the pull-up current of 5 mA and the pull-down current of 10 mA of the Si transistor as an example, the pull-up current of the GaN transistor is about 0.45 mA and the pull-down current is about 0.9 mA. Various parameters of the GaN transistor are better than those of the Si transistor. The driving control circuit according to this embodiment adjusts the driving current and driving voltage of the power transistor according to the protocol, so that different types of transistors can be matched. For example, the control circuit is originally used for the Si transistor and can be directly applied to the GaN transistor, by simply changing the protocol configuration and without replacing the circuit structure to obtain higher performance and benefits.

The above-described input data signal according to this embodiment is implemented by using a single-wire communication protocol configuration. The single-wire communication protocol includes unipolar Return-to-Zero coding, non-unipolar Return-to-Zero coding, bipolar Return-to-Zero coding, and non-bipolar Return-to-Zero coding. Certainly, the above data input signal according to this embodiment can also be implemented by using a serial communication protocol configuration. The serial communication protocol typically operates in a full-duplex communication mode. In this embodiment, the serial communication protocol operates in a simplex communication mode. The MCU sends a command configuration protocol and transmits it to a lighting control circuit. The protocol configuration method can refer to the configuration method of the single-wire communication protocol to achieve the same operation and beneficial effects as the Return-to-Zero coding.

In the lighting control circuit according to this embodiment, the input data signal is provided to the protocol conversion circuit with the configured protocol, and is stored as multi-channel digital signals, and then is converted into a plurality of regulation parameters. The driving voltage and driving current of the power transistor are adjusted according to the driving voltage regulation parameter and driving current regulation parameter in the plurality of regulation parameters. This allows the lighting control circuit to be compatible with various types of power transistors. Therefore, the driving voltage and driving current can be adjusted corresponding to the type of power transistor, only according to data input through a single wire, without the need for replacing the control circuit. The lighting control circuit has improved overall driving capability, adaptability and compatibility.

In the lighting control circuit, the input data signal is input using the configured single-wire communication protocol or the serial communication protocol, and is stored as multi-channel digital signals. According to the multi-channel digital signals, a dimming mode and a dimming signal in the specific dimming mode are configured to generate different driving signals. This allows the lighting control circuit to flexibly select between an analog dimming mode or a chopper dimming mode for dimming, and perform line compensation, so as to meet high-frequency applications and low-frequency applications, thereby enhancing applicability of the power transistor. A plurality of regulation parameters are generated according to the multi-channel digital signals to set different physical parameter thresholds, so that the protection thresholds of protection units can be adjusted flexibly with more adjustment levels. There is no need to provide a plurality of external resistors, and thus reducing the number of various types of compensation resistors outside the circuit or the chip, and reducing the number of peripheral devices, and reducing the number of pins, and reducing the circuit size. The chip has improved integration degree and reduced cost.

FIGS. 4a-4d show schematic waveforms of different types of single-wire protocols according to embodiments of the present disclosure.

Figure 4A:
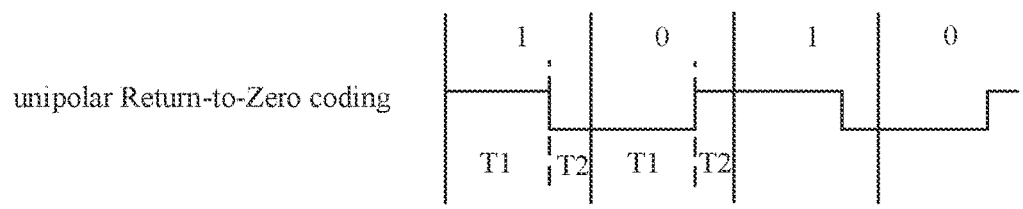
FIGS. 4a-4d show schematic waveforms of different types of single-wire protocols according to embodiments of the present disclosure.

Referring to FIG. 4a, there is shown waveform of unipolar Return-to-Zero coding. In the figure, the waveforms of 4 bits of data is given. For one bit, it can be divided into T1 and T2. T1 occupies a time period longer than T2. When an absolute value of T1 is greater than T2, the bit is high, and the corresponding output is 1. When an absolute value of T1 is less than T2, the bit is low, and the corresponding output is 0.

Figure 4B:
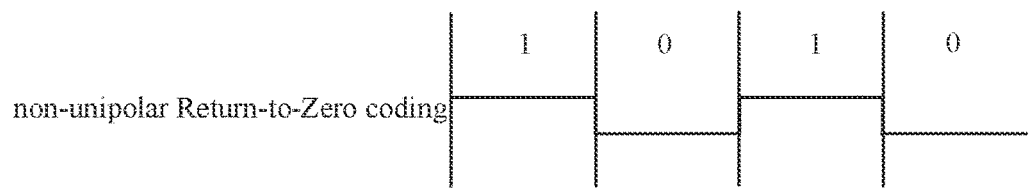

As shown in FIG. 4b, there is shown unipolar non-Return-to-Zero coding, and also contains 4 bits. Determination of a value of each bit is shown in FIG. 4a.

Figure 4C:
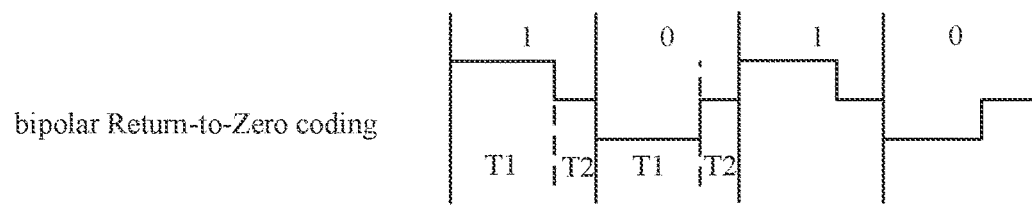
Figure 4D:
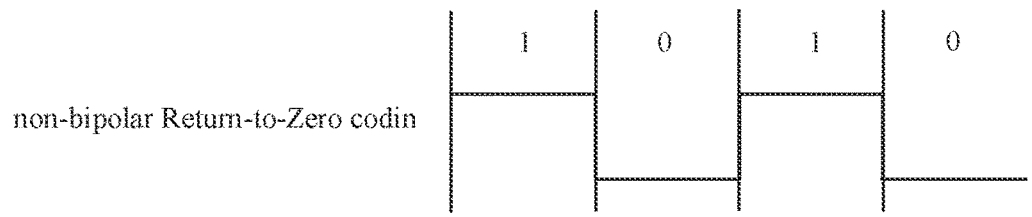

Similarly, FIGS. 4c and 4d show waveforms of bipolar Return-to-Zero coding and non-bipolar Return-to-Zero coding, respectively, each of which contains 4 bits, and determination of a value of each bit is the same as that of FIG. 4a. For the input data signal of this embodiment, whether it is a single-wire communication protocol or a serial communication protocol, the determination of the value of each bit (in encoding and decoding manner) in the data transmission process is the same as that in FIG. 4a.

Figure 5:
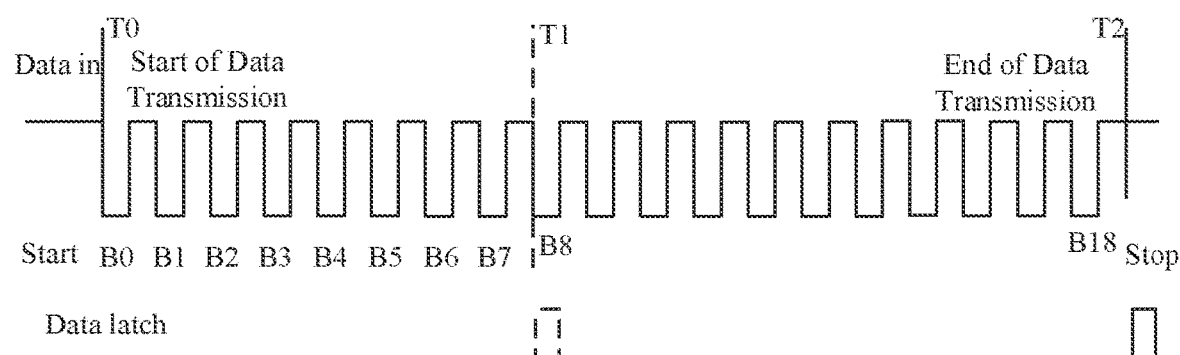
FIG. 5 shows an exemplary waveform diagram of an input data signal received by a driving control circuit according to an embodiment of the present disclosure.

FIG. 5 shows an exemplary waveform diagram of an input data signal received by a driving control circuit according to an embodiment of the present disclosure.

As shown in FIG. 5, a schematic waveform of effective data bits of the input data signal is shown. When the input data signal is configured as a serial communication configuration, one-way data transmission is supported by simplex data transmission, from an MCU to the lighting control circuit of this embodiment. A data packet of the serial communication protocol contains a start bit, data bits, a check bit and a stop bit. FIG. 5 shows waveform of the data bits. When the input data signal is implemented using the single-wire communication protocol, FIG. 5 shows transmission waveform of the effective data bits.

Specifically, in FIG. 5, the number of registers is equal to the bits of the transmitted data. The transmission process of the input data signal is as follows: an external MCU (microcontroller) sends an input data signal with cycles of 1.25 uS for each bit, when the chip receives a high level period exceeding 1.25 uS, it is determined that a Start signal starts, that is, the data transmission is about to start, and a first falling edge after receiving the data of start signal indicates that the first bit starts transmission. In a bit, when a low level period is less than a high level period, it is determined to be 1, and when a low level period is greater than a high level period, it is determined to be 0. A plurality of bits of register is used for storing data of various bit in sequence. When the chip receives a high level again for more than 1.25 uS, it means that the chip receives a Stop signal, that is, the data transmission is finished. During data transmission, the chip locks all of the data of the register into a latch. When a Stop signal is received, a Data latch signal is generated with a rising edge. At this time, the register outputs the data to the DAC unit. The DAC unit then converts the digital signal into an analog signal and sends it to various functional units of the control circuit. The register transmits the data serially by shifting.

If the driving control circuit 100 according to this embodiment is applied to a circuit that does not need to configure a dimming mode, the single-wire protocol can only configure 8 bits, that is, B0-B7. Different bits can be combined into different digital signals. The meaning of each digital signal can be referred to the above embodiment. For example, the bit B0 represents a standby regulation parameter, the bit B1 represents a driving voltage regulation parameter, the bits B2-B3 represent a driving current regulation parameter, the bits B4-B5 and B5-B6 represent an over-temperature protection regulation parameter and an over-voltage protection regulation parameter, respectively. In such case, all of the data after the bit B7 can be high. Then, data transmission is considered to be started at T0, and data transmission is considered to be finished at T1. If a dimming mode needs to be configured, the protocol needs to add a few more bits. For example, the bits B8-B18 are dimming configuration information. Then, a continuous high level is generated after the bit B18. In such case, data transmission is considered to be started at T0, and data transmission is considered to be finished at T2. Similarly, if only a dimming configuration is required, only the data of bits B8-B18 can be kept. The time period T1-T2 is used as a data transmission period.

Certainly, the configuration of the single-wire communication protocol or the serial communication protocol according to the present disclosure is not limited to these. The protocol may be configured according to the needs of the circuit, and the number of the bits may be increased or decreased accordingly, and can be coupled to different circuit units.

Figure 6:
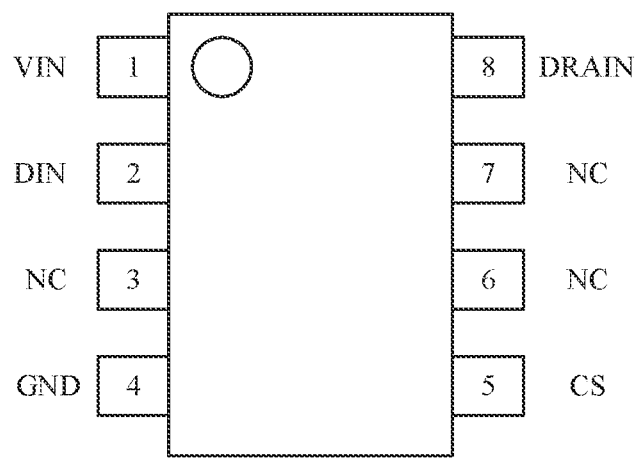
FIG. 6 shows a schematic diagram of a lighting control chip according to an embodiment of the present disclosure.

FIG. 6 shows a schematic diagram of a lighting control chip according to an embodiment of the present disclosure.

As shown in FIG. 6, a lighting control chip 600 is disclosed. The lighting control chip 600 includes the lighting control circuit 200 of the above embodiment. Actually, the chip 600 is a package structure of the above circuit 200. According to FIGS. 2-3, the control chip 600 can include 8 pins, where Pin 1 is a VIN pin to receive an input voltage VIN; Pin 2 is a DATA pin, which receives the input data signal; Pin 3 is an NC pin, that is, a float pin; Pin 4 is a GND pin, coupled to a reference ground; Pin 5 is a CS pin, sampling a source voltage of the transistor M0; Pin 6 is an NC pin, which is float, and which can also be used as an SCL pin to receive a clock signal in a case that the input data signal using a two-wire communication protocol; Pin 7 is an NC pin; Pin 8 is a DRAIN pin, which is coupled to a drain of the main power transistor M0. The control chip of power supply according to this embodiment does not need external compensation resistors. Compared with the chip shown in FIG. 1, the number of pins is decreased, the number of peripheral devices is decreased, and integration degree is increased. At the same time, flexible configuration of the OTP point and the OTP slope can be realized, and more functions of the circuit may be adjusted and more parameters of the circuit may be configured.

Figure 7:
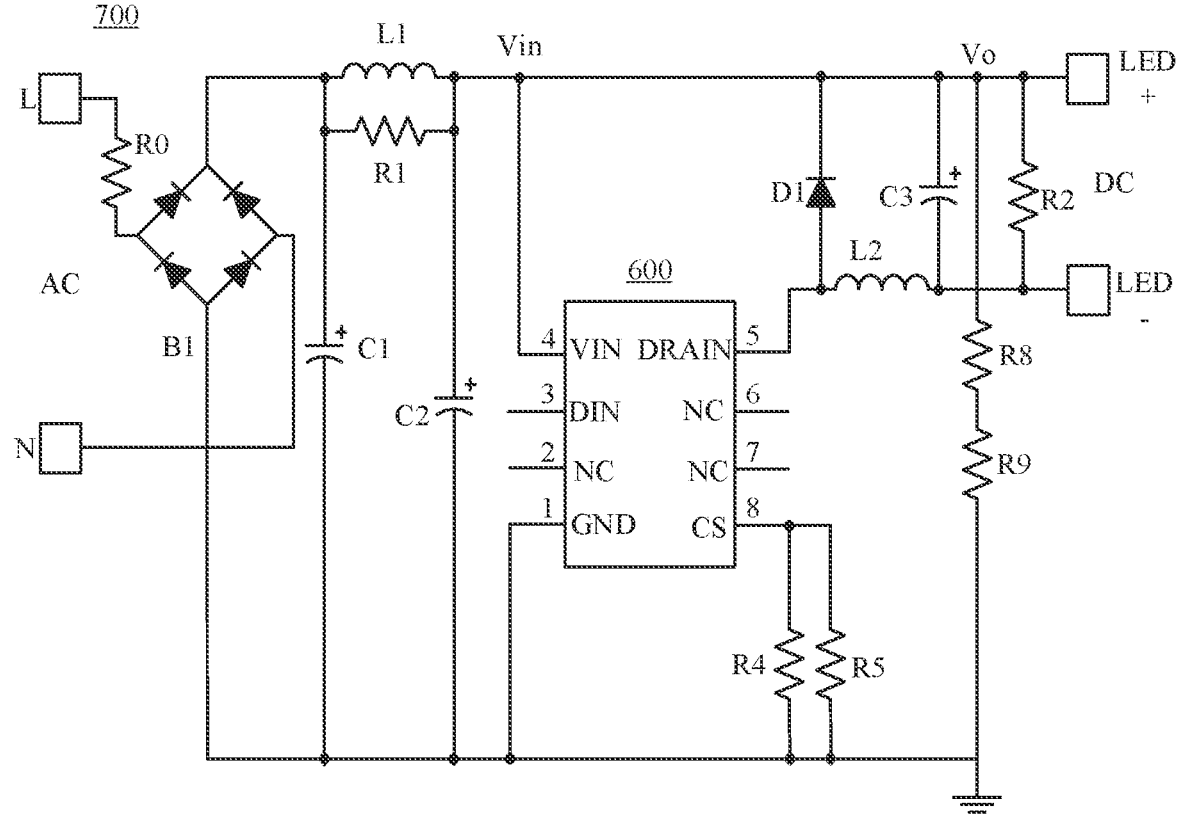
FIG. 7 shows a schematic circuit diagram of a switching power supply according to an embodiment of the present disclosure.

FIG. 7 shows a schematic circuit diagram of a switching power supply according to an embodiment of the present disclosure.

As shown in FIG. 7, a switching power supply 700 is provided, including a control chip 600 of power supply shown in FIG. 6, a rectifier bridge B1, and a buck topology. Here, the rectifier bridge rectifies an AC voltage into an input voltage Vin and provides it to the lighting control chip 600; The lighting control chip 600 controls an operation state of the power transistor M0 in the switching circuit. The buck topology of the switching circuit includes a main power transistor M0, a diode D1, and an inductor L2. Apparently, the buck topology is described as an example in this embodiment. The switching circuit of this embodiment can also be a boost topology or other type of topology. The input voltage Vin is converted to the output voltage Vo by the switching circuit to supply power to a post-stage load.

Further, the present disclosure further provides a lighting circuit including multi-channel LED strings and the above-mentioned switching power supply 700, and the lighting control circuit 200 supplies power for the multi-channel LED strings and is used for controlling the dimming mode of the multi-channel LED strings.

In summary, in the driving control circuit of the power transistor, the lighting control circuit and the lighting circuit according to the embodiments of the present disclosure, the input data signal is provided to the protocol conversion circuit with the configured protocol, and is stored as multi-channel digital signals, and then is converted into a plurality of regulation parameters. The driving voltage and driving current of the power transistor are adjusted according to the driving voltage regulation parameter and driving current regulation parameter in the plurality of regulation parameters. This allows the lighting control circuit to be compatible with various types of power transistors. Therefore, the driving voltage and driving current can be adjusted corresponding to the type of power transistor, only according to the signal input by single-wire, without the need for replacing the control circuit. The lighting control circuit has improved overall driving capability, adaptability and compatibility. Moreover, a single input data pin is used under either a single-wire communication protocol or a serial communication protocol to adjust various circuits and to achieve a plurality of control functions. Thus, the switching circuit control scheme can be achieved in various modes, by simple operations, with a fast speed, and in an efficient manner, and can replace the PWM modulation perfectly.

The above-described embodiments do not constitute a limitation on the scope of protection of the technical solution. Any modifications, equivalent substitutions, improvements, etc. made within the spirit and principles of the above embodiments shall be included in the scope of protection of this technical solution.

What is claimed is:

1. A driving control circuit of a power transistor, comprising:
    a protocol conversion circuit that stores received input data signal as multi-channel digital signals and converts the multi-channel digital signals into a plurality of regulation parameters;
    a driving regulation circuit that is coupled to the protocol conversion circuit and a control terminal of the power transistor, and that adjusts a driving current according to a driving current regulation parameter in a plurality of regulation parameters, and/or adjusts a driving voltage of the power transistor according to a driving voltage regulation parameter in the plurality of regulation parameters, so as to match various types of power transistors, wherein the driving regulation circuit comprises: a voltage regulator that is coupled to the protocol conversion circuit, a power supply terminal and the control terminal of the power transistor, and that converts an input voltage at the power supply terminal into a supply voltage to be supplied to a post stage, and supplying a driving voltage to the power transistor via an output terminal; a pull-up current source that is coupled between an output of the voltage regulator and the control terminal of the power transistor; and a pull-down current source that is coupled between the control terminal of the power transistor and a ground terminal, the pull-up current source and the pull-down current source together providing a driving current to the power transistor.

2. The driving control circuit according to claim 1, wherein the various types of power transistors include Si transistors, SiC transistors, and GaN transistors.

3. The driving control circuit according to claim 1, wherein a driving current and a driving voltage of the GaN transistor have values both smaller than those of the Si transistor.

4. The control circuit according to claim 1, wherein the driving regulation circuit adjusts the driving current of the power transistor to control on and off rates of the power transistor.

5. The driving control circuit according to claim 1, wherein the voltage regulator adjusts the driving voltage according to the driving voltage regulation parameter; the pull-up current source and the pull-down current source adjust the driving current according to the driving current regulation parameters.

6. The driving control circuit according to claim 1, wherein the plurality of regulation parameters are analog signals, and the plurality of regulation parameters further include a standby regulation parameter for configuring a sleep mode for the driving control circuit of the power transistor.

7. The driving control circuit according to claim 6, wherein the driving voltage regulation parameter corresponds to a digital signal of 1 bit, the driving current regulation parameter corresponds to a digital signal of 2 bits, and the standby regulation parameter corresponds to a digital signal of 1 bit.

8. The driving control circuit according to claim 1, wherein the protocol conversion circuit converts the input data signal into the driving voltage regulation parameter and the driving current regulation parameter using a single-wire communication protocol or a serial communication protocol.

9. A lighting control circuit, comprising:
a power transistor;
a driving control circuit of the power transistor according to claim 1; and
a dimming selection circuit that selects a dimming mode according to a digital signal, and that generates a PWM dimming signal in a chopper dimming mode, and generates an analog dimming signal in an analog dimming mode, so as to control on and off states of the power transistor.

10. The lighting control circuit according to claim 9, further comprising:
a protection circuit that obtains a physical parameter threshold according to a regulation parameter generated by the digital signal, and protects the circuit when a sampled physical parameter reaches the physical parameter threshold.

11. A lighting device, comprising:
multi-channel LED strings; and
and the lighting control circuit according to claim 9 for controlling a dimming mode of the multi-channel LED strings.

* * * * *